(12) United States Patent
Klein

(10) Patent No.: US 6,834,454 B2
(45) Date of Patent: Dec. 28, 2004

(54) LOCKABLE MOUNTING AND STORING DEVICE FOR LONG BARREL FIREARMS

(76) Inventor: John M. Klein, 2222 McKechnie Rd., Harrisville, MI (US) 48740

(*) Notice: Subject to any disclaimer, the term of this patent is extended or adjusted under 35 U.S.C. 154(b) by 0 days.

(21) Appl. No.: 10/649,263

(22) Filed: Aug. 26, 2003

(65) Prior Publication Data

US 2004/0064993 A1 Apr. 8, 2004

Related U.S. Application Data

(60) Provisional application No. 60/405,997, filed on Aug. 26, 2002.

(51) Int. Cl.[7] .............................................. F41A 17/00
(52) U.S. Cl. ............................ 42/70.11; 211/4; 211/64; 248/551
(58) Field of Search ........................... 42/70.11; 211/4, 211/64; 248/551

(56) References Cited

U.S. PATENT DOCUMENTS

| | | | | | |
|---|---|---|---|---|---|
| 3,307,755 | A | * | 3/1967 | Lentz | 206/317 |
| 3,802,612 | A | * | 4/1974 | Smith | 224/569 |
| 4,747,280 | A | * | 5/1988 | Shaw | 70/279.1 |
| 5,791,499 | A | * | 8/1998 | Zebbedies | 211/64 |

* cited by examiner

Primary Examiner—J. Woodrow Eldred
(74) Attorney, Agent, or Firm—The Weintraub Group, P.L.C.

(57) ABSTRACT

A device for safely storing a firearm such as a rifle or shotgun includes a frame for securing the device to a surface such as a vehicle floorboard or the like. The device is defined by a locking system for closing off the end of a barrel and the clip area as well as for precluding access to the trigger device. A lock housing, slidably positionable on a tubular member secured to the frame, enables accommodation for various length barrels, and is deployed to close off the open end thereof. The device is particularly adapted for safely mounting and storing a pair of firearms.

16 Claims, 3 Drawing Sheets

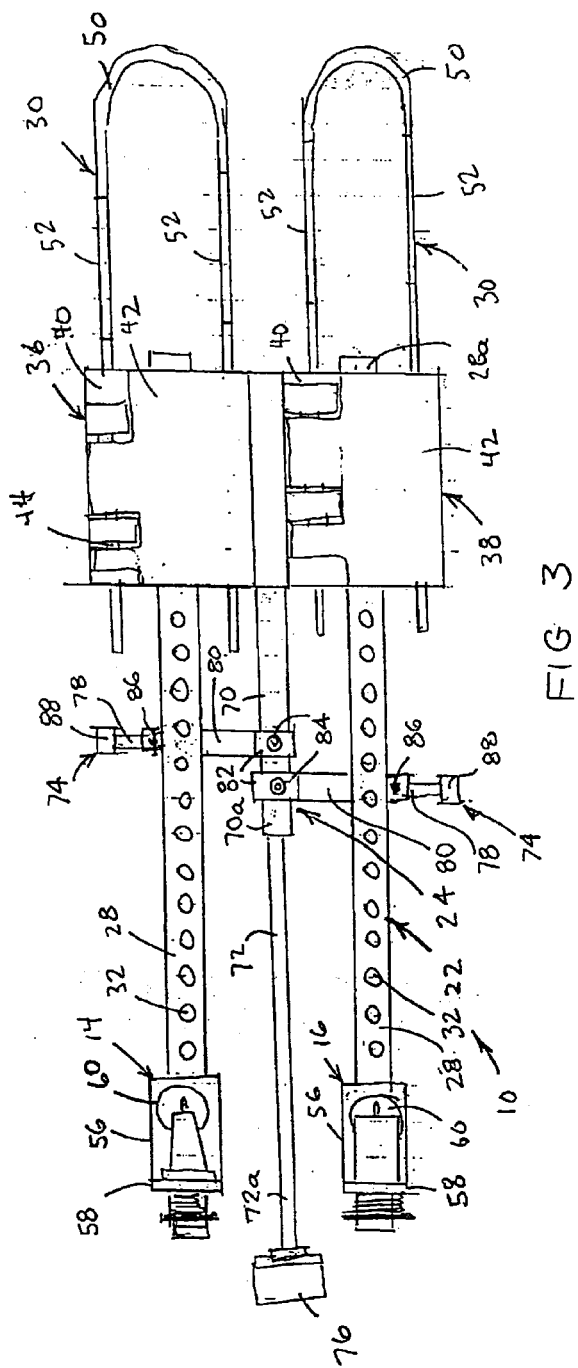
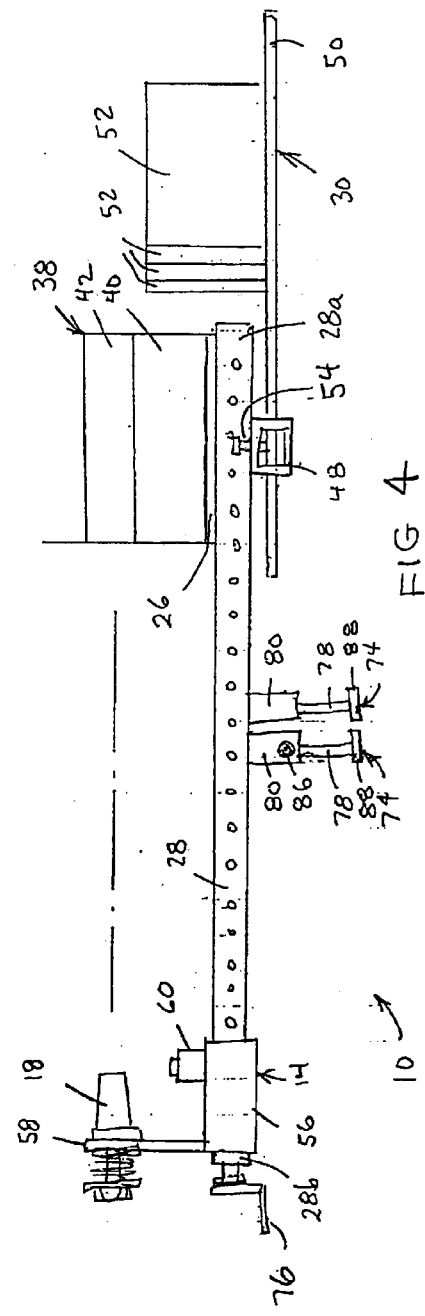

LOCKABLE MOUNTING AND STORING DEVICE FOR LONG BARREL FIREARMS

CROSS REFERENCE TO RELATED APPLICATIONS

This application is a completion application of U.S. provisional patent application Ser. No. 60/405,997, filed Aug. 26, 2002, the disclosure of which is hereby incorporated by reference.

BACKGROUND OF THE INVENTION

1. Field of the Invention

This invention is related to a lockable storing device for a rifle, shotgun, automatic weapon or other long barrel firearm, and more particularly to an apparatus for mounting and safely storing one or more of like or different firearms. In a particular aspect of the invention, the apparatus is longitudinally adjustable and releasably lockable to the open end of the barrel and about the magazine or clip area and shields the trigger area of the firearm to obviate access thereto.

2. Description of Related Art

There is an ongoing need for apparatus that enables the sportsman, law enforcement officers, or military personnel to safely store and secure hunting rifles, shotguns, automatic rifles, such as machine guns, and the like. Apparatus of this type is known and typified by support members being arranged horizontally and/or vertically and which include brackets to secure the firearms in generally parallel side-by-side fashion. In these arrangements, the firearm is secured to the support bracket by a pair of spaced apart supports that engage a portion of the stock and a portion of the barrel.

While suitable for the purposes intended, additional security against unwanted removal of the firearm from the support is desired.

Although it is known to secure a lock member to the trigger mechanism of the a handgun to obviate unexpected discharge of the firearm, this is not altogether satisfactory for a firearm.

Further, due to the difference in each users needs, a desirable apparatus would be adjustable to accommodate various barrels, whether in length, or bore diameter, or in the case of a shotgun, having two bores, various stocks, and trigger areas of different size and orientation relative to the stock.

SUMMARY OF THE INVENTION

An object of this invention is the provision of a mounting apparatus which is capable of securing a pair of rifles, shotguns or other long barreled firearms in side-by-side relation in such fashion that the trigger area, barrel end and clip or magazine areas are not accessible.

A further object of this invention is the provision of a mounting apparatus that includes at least one supporting arrangement that is axially adjustable and able to accommodate rifles and firearms of different lengths and barrel configurations.

A further object of the invention is to provide a locking member for connection to the end portion of an otherwise open barrel, which is capable of quick and easy connection thereto and modifiable to connect to the specific firearm of the user.

An object of the locking member is the provision of a safety device that is axially insertable into or around the open end of the barrel, depending on the nature of the firearm.

A further object of the locking member is provision of a barrel engaging element that is rapidly replaceable to accommodate barrels of different diameters and which does not damage the interior or exterior surfaces of the barrel.

In accordance with one aspect of the invention there is provided an apparatus for securing a firearm, the firearm being of the type including an elongated barrel having an open end, a magazine or clip receiving portion, and a trigger mechanism, said securing apparatus comprising:

means for enclosing and locking the clip receiving portion of said firearm to said apparatus, means for securing and locking the open end of said barrel to the apparatus, and means for shielding and preventing unwanted access to said trigger mechanism.

The apparatus preferably comprises a frame adapted to be mounted to a surface, such as a floor, and includes an elongated longitudinally extending bar, and means connected to the bar for selectively positioning the frame relative to the surface.

According to another aspect of the invention, the means for securing and locking the open end of the barrel comprises a lock housing adapted for use with a key to lock the housing to the frame, a latch moveable to and from a locked position wherein the latch is outwardly of the lock housing and interlocked with the frame, means for biasing the latch member away from the locked position, and means operated by the key for releasing the latch from the locked position and inwardly of the housing.

Preferably, the lock housing includes a planar flange extending from the lock housing, an elongated longitudinally extending support member having a forward end adapted to be fitted to the open end of the rifle or shotgun and a rearward end, means for connecting the rearward end of the support member to the flange whereby the forward end of the support member may pivot relative to the rearward end, and means for biasing the support member such that the axis of the support member is generally maintained perpendicular to the plane of the flange. Depending on the specific firearm, the support member is generally frusto-conically shaped and the forward end thereof adapted to be received inside of the barrel, or a hollowed out cylindrical body and the forward end thereof adapted to be received about the end of the barrel.

According to this invention, the means for enclosing and locking the clip receiving portion of said firearm to the apparatus comprises a cradle including a cover hingedly mounted to a base and movable between an open position whereby the firearm may be positioned onto the base and a closed position in enclosing relation to the firearm, and a lock member to lock the cover to the base member to prevent unwanted removal of the firearm from the cradle. Preferably, the lock member is electromechanical in nature and remotely controlled whereby to enable electrical actuation when desired.

Advantageously, the apparatus herein provides for mounting, storing, displaying, locking, and providing quick access to the firearm.

A further advantage of this apparatus is provision of a high security, inexpensive and versatile manner of locking firearms within a theft-proof gun rack. Once a firearm is in place, the locks of the forward locking housings that engage the open end of the barrel are unreachable.

While this invention is of particular use in connection with a long barreled firearm, it is to be appreciated that the apparatus herein advantageously provides for mounting, storing, displaying, locking and providing quick access to merchandise other than firearms. That is, the apparatus provides a high security, inexpensive and versatile manner of locking specially configured objects to a theft-proof rack.

BRIEF DESCRIPTION OF THE DRAWINGS

For a more complete understanding of the present invention, reference is made to the following detailed description and accompanying drawings. In the drawings, like reference characters refer to like parts throughout the several views, in which:

FIG. 3 is a plan view of the apparatus shown in FIG. 1;

FIG. 4 is a side elevation view of the apparatus shown in FIG. 1;

DETAILED DESCRIPTION OF A PREFERRED EMBODIMENT OF THE INVENTION

Figure 1:
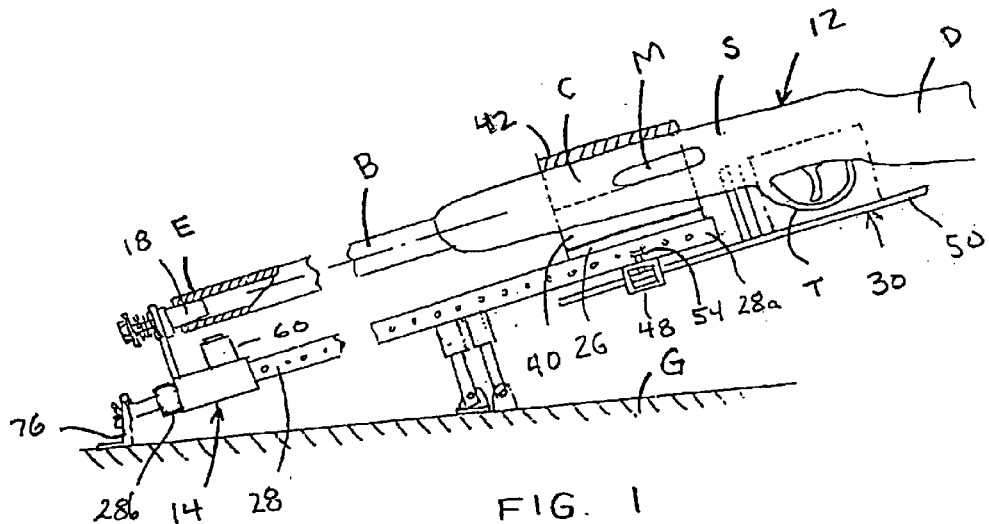
FIG. 1 is an elevation view, partially in section, of a long barreled firearm secured by a storing apparatus according to the invention.

Turning now to the drawings, FIGS. 1–6 disclose, in combination, a mounting apparatus generally designated at 10, for mounting and locking two long barreled firearms 12 to the apparatus in side-by-side relation. Although the preferred embodiment of the mounting apparatus disclosed in FIGS. 1–6 is for mounting two firearms in side-by-side relation, the apparatus could be reconfigured to mount more than two firearms in side-by-side relation, or mount only one firearm. FIG. 1 discloses a firearm 12 when locked in place to the apparatus 10.

As contemplated by this invention, a firearm 12 adapted to be locked to the apparatus generally includes a stock S, the stock having a central portion C and a rearwardly extending butt portion D, an elongated barrel B which extends forwardly from the stock to an open discharge end E at the forward end of the barrel, an ammunition loading slot M disposed centrally of the stock, and a trigger mechanism T proximate to the ammunition loading slot M and extending from the stock for use by the user. The firearm can be a typical hunting rifle, an automatic rifle, or a shotgun, to name a few. The primary difference between the various firearms that may be secured resides in the number of barrels of the firearm, the diameter of the barrel, and whether a sighting element extends outwardly from the barrel end.

In accordance with this invention, and as well be described hereinbelow, a lock housing 14 and 16 is positioned relative to the apparatus with each housing being provided, respectively, with a barrel support member 18 and 20 sized to be fitted to the open end E of the barrel B. In FIG. 1, the firearm 12 is typical of a hunting rifle wherein the support member 18 of the lock housing 14 is frusto-conically shaped and inserted into the open forward end portion of the barrel. For larger barreled firearms (not shown), or firearms having sighting elements extending outwardly of the barrel, the support member 20 of the lock housing 16 forms a cylindrical shaped receptacle that is fitted about the open forward end portion of the barrel.

The mounting apparatus 10 comprises a frame 22, and a mounting bracket 24 for mounting the frame to a support surface G, such as the ground or a mounting board disposed horizontally. While the mounting apparatus 10 is preferably intended to be mounted on a horizontal surface, the mounting bracket 24 enables the frame 22 to be mounted as desired. As such, depending on the center of gravity of the firearms so secured to the frame 22, the orientation of the firearms may be changed as desired.

The frame 22 includes a central support plate 26, a pair of elongated tubes 28, and a pair of trigger shield supports 30. The elongated tubes 28 are generally of rectangular cross-section and each has a proximal end 28a secured, such as by welding, to the central plate 26, and a distal end 28b spaced from the central plate. So secured, the tubes 28 are generally parallel to one other and the tube axes lie in a common plane.

A series of engageable detents 32 are formed along teach tube 28 for engagement by a latch member 34 associated with each housing 14 and 16, as well be described hereinbelow. As shown, the detents 32 are generally linearly disposed, equidistantly spaced, and formed by a series of generally circular apertures in the upper wall of the tube. It is to be understood that if a specific end user desires to mount firearms of predetermined and/or of specific lengths, the detent spacing could be pre-set to conform to the length of the specific firearms to be secured.

Mounted atop the central plate 26 is a pair of cradles 36 and 38 for receiving the central stock C of a respective firearm. Each cradle 36 and 38 is similar in that each includes a base 40 that is secured to the central plate 26 and a cover 42 that is connected by a hinge 44 to the base with each cover 42 being adapted to swing upwardly from a closed position encircling the firearm stock and to an open position. Each base 40 and cover 42 has a generally semi-cylindrically shaped portion with the shaped-portions being configured to snugly enclose about the width of the stock C and prevent access to the ammunition loading slot M.

Figure 2:
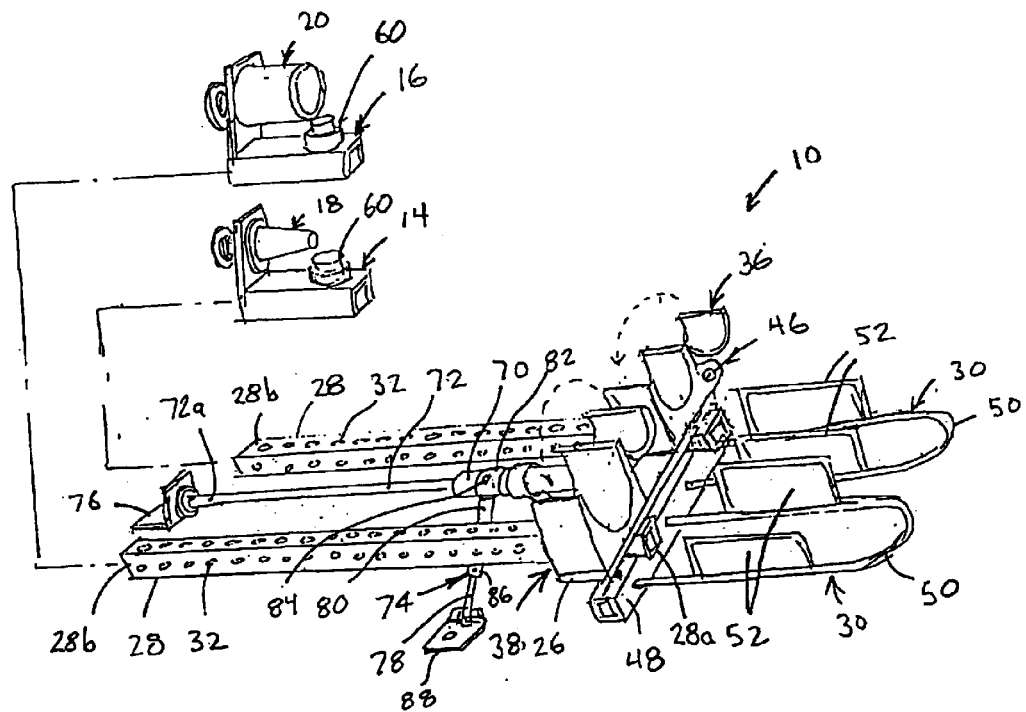
FIG. 2 is a perspective view looking downwardly at the storing apparatus for securing a pair of different types of firearms in side-by-side relation, and a pair of lock housings positioned for assembly on the apparatus, according to the invention.

In a preferred embodiment according to this invention, as a way to further make the firearms theft-proof, one or both cradles 36 and 38 may be provided with a lock member. As shown in FIG. 2, the cradle 36 is provided with a lock 46 to lock the cover 36 in its closed position. Further, for use in certain applications, the lock 46 may be electromechanical in nature whereby to enable electrical actuation, remote operation, and/or connection to a security system to monitor the opening of the lock. Details of the lock mechanism, whether mechanical or electromechanical, are conventional and not shown.

Each trigger shield support 30 is connected to the plate 26 by an elongated tube 48 of rectangular cross-section that extends transversely across and is welded to the bottom of the central plate 26. Each trigger shield support 30 includes a generally U-shaped frame member 50 with the free end portions of the legs of each U-shaped frame member passing through a respective aperture provided in opposite walls of the tube 48, the axial end portions of the legs mounting the trigger shield support for movement relative to the cross tube 48.

Preferably and according to this invention, a generally planar, rectangular, trigger shield 52 extends upwardly from each leg of the U-shaped frame member 50. The trigger shields 52 on each trigger shield support 30 are generally parallel to one another, confronting one another, and perpendicular to a plane passing through the tubular members 28 and the frame member 50.

The trigger shields 52 are adapted to be positioned in blocking relation with the trigger T of the firearm. In some applications, depending on the nature of the firearms and the location of their respective triggers T, the shields 52 may be staggered (see FIG. 4).

To adjust for rifles of different lengths, and enable the trigger shields 52 to be positioned as needed relative to the rifle trigger, a locking member 54, such as a set screw or other suitable device, is threadably engaged with an upper wall of the cross tube 48 and adapted to be moved inwardly of the tube interior and engage the leg of the frame member 50 movably positioned therewithin. In some applications, the U-shaped frame members 50 that position the trigger shields 55 are fixed and not slidable relative to the frame 22.

The lock housings 14 and 16 are adapted to be movably positioned on either tubular member 28 and locked in a selected position relative thereto and thereby position a barrel support member 18 or 20 relative to the open end of a rifle barrel B to be mounted to the frame 22. As shown best in FIGS. 5 and 6, each lock housing 14 and 16 includes a tubular housing member 56 of generally rectangular cross-section, a planar flange member 58 that extends perpendicularly upwardly from one end of the housing member 56, a lock member 60, and one of the support members 18 and 20 for fitment to the end portion of the barrel.

The tubular housing member 56 is dimensioned to telescope about the one of the elongated tubular members 28 so as to enable the lock housing 14 and 16 to axially slide therealong and relative thereto. The latch member 34 is carried by the lock housing and sized to be received in a selected detent 32 whereby to position the lock housing relative to the tubular member 28.

The lock member 60, usable with a key (not shown), includes a casing 62 that extends upwardly from the tubular housing member 56, a latch actuator 64 mounted for movement relative to the casing, the latch member 34 being connected to the latch actuator and movable therewith between locked and unlocked positions, a key operated latch detent (not shown) associated with the latch actuator 64 that maintains the latch actuator in the locked position, and a spring member (not shown) that normally biases the latch actuator towards the unlocked position. Details of the lock member are conventional and understood by those skilled in the art and well not be described in detail.

Two different barrel support members 18 and 20 are provided. In a first preferred embodiment, the barrel support member 18 is solid and includes a generally frusto-conically shaped male member 18a that is coaxially aligned with and extends from a cylindrical base member 18b. The frusto-conically shaped male member 18a is adapted to be inserted into the open end of the barrel B. In a second preferred embodiment, the barrel support member 20 includes a generally cylindrical receptacle 20a that is coaxially aligned with and extends from a cylindrical base member 20b. The cylindrical receptacle 20a is adapted to be fitted about the open end of the barrel. Depending on the application, the receptacle 20a would enclose the barrel and the sighting element that extends from the barrel.

While many materials are suitable, the support members 18 and 20 are preferably formed of a polymeric material that is resistant to cracking and will not scratch the exterior or interior metallic surfaces of the barrel. According to this invention, the support members are preferably comprised of Teflon.

The barrel support members 18 and 20 are pivotably mounted to the flange 58. The mounting arrangement is the same for each and although the description that follows applies to the support member 20 the description applies as well to the support member 18.

Figure 6:
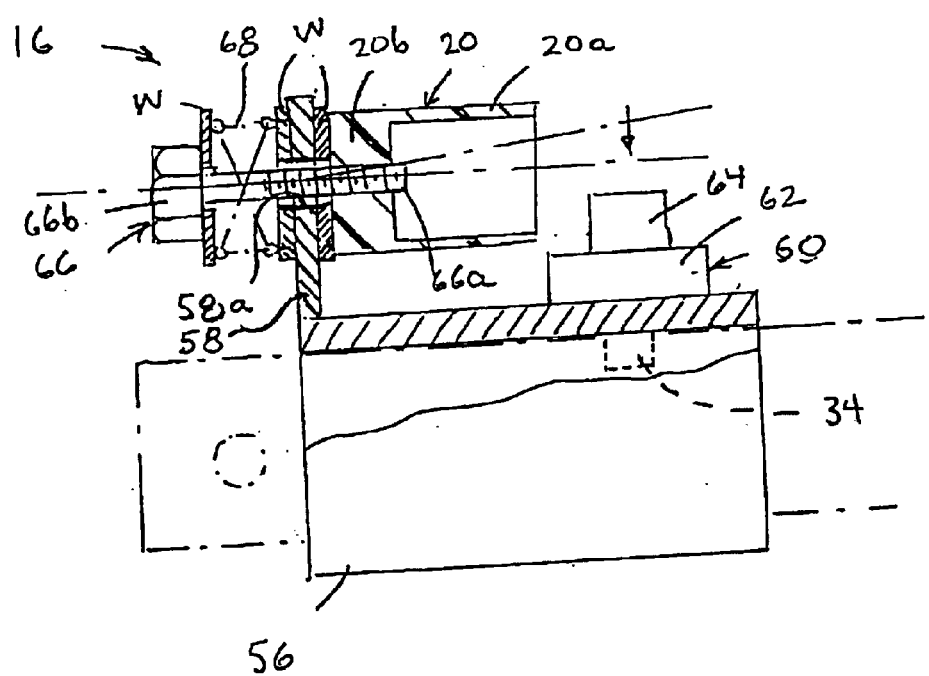
FIG. 6 is a section view of the other lock housing shown in FIG. 2.

Referring to FIG. 6, an elongated threaded shank 66a of a headed fastener 66 is passed through an opening 58a in the flange 58 and threadably secured to the base 20b of the support member 20 on one side of the flange 58, positioning the head 66b of the fastener on the other side of the flange 58 remote to the support member 20. The threaded shank 66a is dimensioned so as to allow a coil spring 68 to be positioned, under compression, between the head 66b and the flange 58. In such mounting, the coil spring permits the shank 66a, and the combination of the support member 20 with the shank, to pivot within the opening 58a and relative to the flange 58, and the axis of the shank (and support member) to rotate 360° relative to the plane of the flange member 58 whereby to facilitate fitment between the barrel end and the barrel support.

The coil spring 68 operates to always want to restore the axis of the support member into a perpendicular relation with the flange 58 and the axis of the support member aligned with the axis of the barrel B. Desirably, however, the coil spring enables the firearm to be more easily mounted to the apparatus. That is, when the firearm is to be mounted, the coil allows the support member to rotate upwardly (or sidewise) relative to the flange to allow ease of insertion about (or into) the barrel.

Preferably, a washer W is positioned between the fastener head 66b and one end of the coil spring 68, the other end of the coil spring 68 and the flange 58, and the flange 58 and the base 20b. The washers W distribute forces and contribute to the proper functioning of the mounting.

Preferably, the end portion of the shank 66a that is connected to the base 20b of the support member is threaded. Once fitted to the forward end portion of the barrel, a small rotation of the support member relative to the shank 66a will enable the support member 20 (or 18) to advance axially by a small amount and allow a snugger fit relative to the barrel to be achieved.

The mounting bracket 24 for mounting the frame 22 to the support surface G includes an elongated shaft 72 disposed in part within an elongated outer sleeve 70, and a pair of struts 74. The assembly of the shaft 72 and the sleeve 70 is disposed between the tubular members 28, extends in generally parallel relation thereto, and is generally in a common plane therewith. The sleeve 70 has a proximal end (not shown) secured, such as by welding, to the cross tube 48, and a distal end 70a disposed medially between the opposite ends 28a and 28b of the tubular members 28.

The shaft 72 has its proximal end portion disposed within the distal end 70a of the outer sleeve 70 and a distal end 72a disposed forwardly of the forward ends 28b of the tubular members 28. An L-shaped mounting bracket 76 is pivotably secured to the distal end 72a of the shaft 72 for mounting or otherwise securedly positioning the frame 22 to the support surface G.

According to the invention, the proximal end of the shaft 72 may be slidably received in the distal end 70a of the outer sleeve 70 whereby to enable the shaft 72 to rotate or be axially extended relative to the sleeve 70. In such assembly, the mounting bracket 76 may be positioned both axially and angularly for securement to a desired mounting or support surface G. In this regard, a screw arrangement (not shown) would be provided to immovably secure the shaft 72 in its desired position relative to the sleeve 70.

The struts 74 are disposed proximate to the distal end 70a of the outer sleeve 70 and each strut includes an elongated shaft 78 slidably telescoped in part in an outer sleeve 80, a C-shaped mounting bracket 82 for mounting the proximal end of the outer sleeve 80 to the distal end 70*a* of the outer sleeve 70, a screw adjustment arrangement 84 for immovably securing the mounting bracket 82 at a desired angular position relative to the outer sleeve 70, a screw arrangement 86 for immovably securing the shaft 78 at a desired axial extension relative to the outer sleeve 80, and relative to the outer sleeve 70 to which the strut 74 is attached, and an L-shaped mounting bracket 88 for securing the distal end of the shaft 78 to the support surface G. The shaft 78 is axially extensible and angularly positionable relative to its connection to the sleeve 80 whereby to position the mounting bracket 88 relative to the mounting surface G. The screw arrangements 84 and 86 permit the angular orientation of the two struts 74 relative to the sleeve 70 to be changed as desired and the axial extension of the shafts 78 to be positioned relative to the sleeve 80 as desired.

In operation, the mounting brackets 76 and 78 are secured to the support surface G, thereby positioning the frame 22 in a desired orientation relative to the support surface G. In so doing the struts 74 preferably are at an acute angle (e.g., forming a V) relative to the surface G and the plane including the tubes 28 and the mounting bracket 24 is at an acute angle to the surface G.

The rifle to be secured to the frame 22 is sized for fitment relative to the lock housings 14 and 16, the cradles 36 and 38, and the trigger shields 52. The lock housings 14 and 16 are fitted onto the distal ends 28*b* of the respective tubular members 28, and positioned where desired. The latch member 34 is aligned with a detent 30 on the tubular member 28, and the latch actuator 64 is pushed downwardly and into locked engagement with the latch detent. Simultaneously therewith, the latch member 34 is driven downwardly and into the detent 30. The latch detent in the casing 62 maintains the latch member 34 in its downward locked position. Upon actuation of the key, the latch actuator 64 and the latch member 34 are released from their respective detents and the lock housing is released from its locked position with the tubular member 28 and may be repositioned thereon as desired.

The trigger shields 52 are positioned relative to the frame 22, if the frame members 50 are slidably adjustable.

Figure 5:
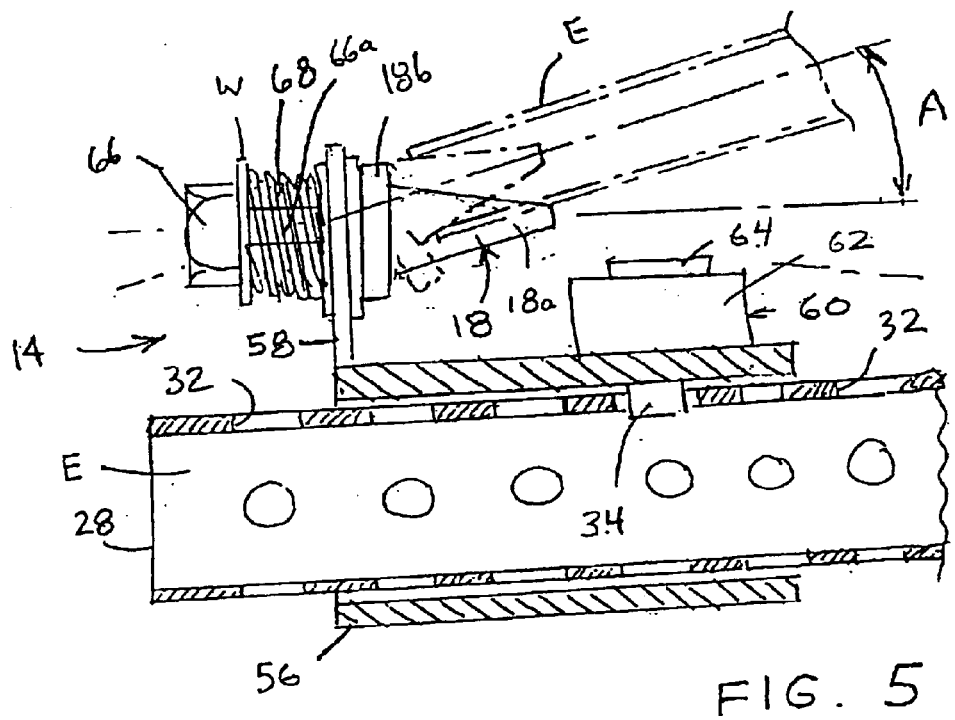
FIG. 5 is a section view of one of the lock housings shown in FIG. 2.

As shown in FIG. 5, the firearm 12 is positioned relative to the apparatus 10 with the forward end portion E of the barrel B positioned over the frusto-conical end portion 18*a* of the support member 18. During this positioning, the support member 18*a* bends or pivots upwardly and its axis disposed at an angle A.

The firearm is lowered with the stock C being received in the cradle 36 whereby to cover the ammunition loading slot M, the trigger portion T being shielded between a pair of shield plates 52. Thereupon, the cover 42 is secured to the base 40 of the cradle.

So mounted, the axis of the barrel B is aligned with the axis of the support housing to which it has been mounted and in generally parallel relation with the axes of the tubes 28, 72 and 80.

It should be noted with respect hereto that the present invention is susceptible to modification such that the cradles are slidable and the locking mechanism is stationary. Similarly, both may be rendered substantially stationary. Also, the keyed lock could be replaced with a nut and bolt combination. Also, the legs 80 may be telescoping legs.

What is claimed is:

1. A device for storing a firearm, the firearm being of the type including an elongated barrel, a clip receiving portion and a trigger, the device comprising:

a frame for securing the device to a surface, the frame including:
  (a) an elongated longitudinally extending bar,
  (b) means for selectively positioning the frame relative to the surface, the means for positioning being connected to the bar,
  (c) a central support plate,
  (d) a pair of spaced apart tubes, and
  (e) a pair of spaced apart trigger shields,
means for enclosing and locking the clip receiving portion of said firearm to said device,
means for securing and locking the open end of said barrel to the device, and
means for shielding and preventing unwanted access to said trigger, said trigger shields defining the means for shielding.

2. The device of claim 1 wherein the means for securing and locking the open end of the barrel comprises:
  (a) a lock housing lockable to the frame;
  (b) a latch moveable to and from a locked position, the latch being disposed outwardly of the lock housing and interlocked with the frame;
  (c) means for biasing the latch member away from the locked position, and
  (d) means for releasing the latch from the locked position and inwardly of the housing.

3. The device of claim 2 wherein the housing is a key lock, the means for releasing being a key actuable means for releasing.

4. The device of claim 2, wherein the lock housing includes:
  (a) a planar flange extending from the lock housing,
  (b) an elongated longitudinally extending barrel support member, said support member having a forward end adapted to be fitted to the open end of the barrel and a rearward end,
  (c) means for connecting the rearward end of the support member to the flange whereby the forward end of the support member is pivotably moveable relative to the rearward end, and
  (d) means for biasing the support member such that the axis of the support member is generally maintained perpendicular to the plane of the flange.

5. The device of claim 4 wherein: the support member is a frusto-conical member, the forward end thereof being received inside of the barrel.

6. The device of claim 4 wherein: the support member is a hollowed out cylindrical body, the forward end thereof being received about the end of the barrel.

7. The device of claim 1 wherein: the means for enclosing and locking the clip receiving portion of said firearm to the device comprises:
  (a) a cradle including a cover;
  (b) a base; and
  (c) a cover hingedly connected to the base, the cover being movable between an open position whereby the firearm may be positioned onto the base and a closed position in enclosing relation to the firearm.

8. The device of claim 7 which further comprises:
a lock member to lock the cover to the base to prevent unwanted removal of the firearm from the cradle.

9. The device of claim 8 wherein the lock member is an electromechanical lock, the lock being remotely controlled to enable electrical actuation.

10. The device of claim 1 which further comprises:
(a) a plurality of engageable detents disposed along the length of each tube, and
(b) a latch member associated with each tube and carried by the means for securing each latch member engageable with a selected detent to selectively position the frame.

11. The device of claim 4 which further comprises:
a pair of barrel support members, and
wherein the device stores a pair of spaced apart firearms.

12. A device for storing first and second firearms, each firearm being of the type including, in sequence, between a forward end to a rearward end, an elongated barrel having a discharge opening, an ammunition receiving slot, a trigger mechanism, and a stock, the device comprising:
a mounting bracket for securing said device to a stationary surface,
a first and second frame, said frames being configured for securing, locking, and storing a respective of said first and second firearms in a manner free from engagement with the stock of the firearm,
means for mounting said first and second frames to said mounting bracket in side-by-side relation to one another and said mounting bracket, each said frame comprising:
first means for enclosing and locking the ammunition receiving slot of the firearm,
second means for securing and locking the discharge opening formed at the forward end of the barrel, and
third means for shielding and preventing unwanted access to said trigger mechanism, said means for shielding being spaced from said second means.

13. The device of claim 12, wherein
said means for mounting includes a mounting plate,
said frame includes an elongated longitudinally extending bar, said bar having a rearward end portion connected to said mounting plate and a forward end portion, and
said first means for locking and securing comprises upper and lower clam-shell portions which move between an open first position wherein the lower clam-shell is upwardly open to permit receipt or release of the firearm and a closed second position wherein the upper clam shell is secured to the lower clam-shell and about the firearm when disposed between the clam-shell portions.

14. The device of claim 13, further comprising;
means for selectively positioning said second means relative to said longitudinally extending bar wherein to accommodate firearms of different length.

15. The device of claim 14, wherein: said means for selectively positioning comprises:
an array of apertures longitudinally disposed along the length of said elongated longitudinally, and
said second means includes a locking member, said locking member being adapted to engage a desired of said apertures to thereby position the second means relative to said bar.

16. The device of claim 13, wherein said third means comprises a pair of planar laterally spaced trigger shields, the shields being in juxtaposed closing relation against the trigger mechanism.

* * * * *